US008168093B2

(12) United States Patent
Alrutz

(10) Patent No.: US 8,168,093 B2
(45) Date of Patent: May 1, 2012

(54) CABLE HAVING INTERNAL IDENTIFYING INDICIA AND ASSOCIATED METHODS

(75) Inventor: Mark E Alrutz, Hickory, NC (US)

(73) Assignee: Commscope, Inc. of North Carolina, Hickory, NC (US)

( * ) Notice: Subject to any disclaimer, the term of this patent is extended or adjusted under 35 U.S.C. 154(b) by 284 days.

(21) Appl. No.: 12/233,375

(22) Filed: Sep. 18, 2008

(65) Prior Publication Data

US 2009/0032985 A1 Feb. 5, 2009

Related U.S. Application Data

(62) Division of application No. 11/379,927, filed on Apr. 24, 2006, now Pat. No. 7,468,489.

(51) Int. Cl.
*G02B 6/04* (2006.01)
*B29C 47/06* (2006.01)
*B29C 47/00* (2006.01)

(52) U.S. Cl. .................... 264/1.28; 264/211.12; 264/132

(58) Field of Classification Search ............. 264/171.13; 156/52; 174/112
See application file for complete search history.

(56) References Cited

U.S. PATENT DOCUMENTS 1,812,686 A 6/1931 Crowdes ........................ 156/166
3,505,916 A 4/1970 Brandt .............................. 82/54
4,279,851 A * 7/1981 Lord et al. ............... 264/171.14
4,868,023 A * 9/1989 Ryan et al. ................... 428/35.1
5,469,523 A * 11/1995 Blew et al. .................... 385/101
5,621,838 A * 4/1997 Nomura et al. ............... 385/100
5,796,905 A 8/1998 Hoffart et al. ................. 385/128
6,207,902 B1 3/2001 Balaguer ........................ 174/112
6,304,701 B1 * 10/2001 Bringuier et al. ............. 385/106
6,727,433 B2 4/2004 Tsai ............................. 174/110
6,825,419 B2 11/2004 Grogl et al. ................... 174/112
6,915,564 B2 7/2005 Adams ............................ 29/828
7,193,155 B2 * 3/2007 McMillan et al. ............ 174/112
2002/0164133 A1 11/2002 Rattazzi et al. ............... 385/100
2005/0252676 A1 11/2005 McMillan et al. ............ 174/112
2007/0113401 A1 * 5/2007 Elias ............................... 29/861

FOREIGN PATENT DOCUMENTS

GB 387626 * 8/1932
GB 2154785 9/1985
JP 2007273267 A * 10/2007

* cited by examiner

*Primary Examiner* — Philip Tucker
*Assistant Examiner* — Vicki Wu
(74) *Attorney, Agent, or Firm* — Allem Dyer, Doppelt, Milbrath & Gilchrist, P.A.

(57) ABSTRACT

A cable for ensuring the authenticity thereof and discouraging the unauthorized counterfeiting of the cable may include a cable core and an opaque outer jacket surrounding the cable core. The jacket may include identifying indicia visible on an inner surface of the opaque outer jacket when opened, but visually obscured from viewing from outside the opaque outer jacket when unopened. The indicia may be integrally molded plastic stripes, for example.

15 Claims, 4 Drawing Sheets

CABLE HAVING INTERNAL IDENTIFYING INDICIA AND ASSOCIATED METHODS

RELATED APPLICATION

This application is a divisional of Ser. No. 11/379,927 filed Apr. 24, 2006, now U.S. Pat. No. 7,468,489, the disclosure of which is hereby incorporated by reference in its entirety.

FIELD OF THE INVENTION

The present invention relates to the field of cables, and, more particularly, to cables having identifying indicia and associated methods.

BACKGROUND OF THE INVENTION

A manufacturer of electrical or optical cable may rely on consumer association with the manufacturer's name to secure future sales. The consumer may similarly rely on association with a particular manufacturer's cable to meet a desired level of performance. If a particular manufacturer's cable is counterfeited and sold, it not only results in lost sales, but such may tarnish the manufacturer's name and future sales.

Several techniques have been used to assist consumers in verifying a particular manufacturer as the source of a cable, such as including the manufacturer's name on the cable reel or on the outside of the outer cable jacket, for example. Unfortunately, one drawback of such verification techniques is their visible placement may result in easy counterfeiting.

In addition to techniques for verifying a cable manufacturer, several techniques have been disclosed for visually distinguishing cables from one another and identifying particular cable component ends for their respective connection at an appropriate termination point. For example, U.S. Published Patent Application No. 2002/0164133 to Rattazzi et al. discloses a method for color coding optical fibers, and buffer tubes containing a plurality of optical fibers. The color coding approach assigns a particular color code to the outer coating and inner coating of a buffer tube outer jacket; the outside coating, middle cross section, and inside coating of the buffer tube; and the coatings of the fibers through the buffer tube. By assigning multiple color codes to each cable component, a greater number of cables can be distinguished from one another.

Another example of a color coding approach for visually distinguishing cables is disclosed in U.S. Pat. No. 6,727,433 to Tsai including a cable having one or more conductors around which one or more color windings are uniformly wound and secured to the conductors by heating. A transparent plastic covering formed on the winding by extrusion molding permits viewing of the color windings from outside the cable.

Further, another similar example of a color coding approach for identification of cables is disclosed in U.S. Published Patent Application No. 2005/0252676 to McMillan including a cable containing a core within a jacket, and with the core including twisted pairs of insulated conductors. The insulated coverings of the twisted pairs of conductors include a coloring scheme with the respective conductors in the twisted pair having a substantially solid dark and lighter shade of the same color on their respective insulations.

Although these color coding systems provide a system for distinguishing cables and/or components thereof, they do not attempt to ensure the authenticity of a cable or discourage the unauthorized counterfeiting of cables. Accordingly, there is a need to develop a cable structure and methods to facilitate the authentication of a cable.

SUMMARY OF THE INVENTION

In view of the foregoing background, it is therefore an object of the present invention to provide a cable and associated methods for ensuring the authenticity thereof and discouraging the unauthorized counterfeiting of the cable.

This and other objects, features, and advantages of the present invention are provided by a cable comprising a cable core and an opaque outer jacket surrounding the cable core, with identifying indicia visible on an inner surface of the opaque outer jacket when opened, but visually obscured from viewing from outside the opaque outer jacket when unopened. The identifying indicia on the inner surface of the opaque outer jacket may comprise color-coded indicia, for example.

The opaque outer jacket may comprise a plastic, and the identifying indicia may comprise at least one integrally molded plastic portion with the opaque outer jacket and having a different color than a color of the opaque outer jacket. The at least one integrally molded plastic portion may comprise different colored stripes, for example. Some of the different colored stripes may be continuous or discontinuous. Some of the different colored stripes may be arranged in a side-by-side or circumferentially spaced apart relation.

The cable core may include optical components and/or electrical components. For example, the cable may be a coaxial drop cable wherein the cable core may comprise an inner conductor, a dielectric layer surrounding the inner conductor, and an outer conductor surrounding the dielectric layer.

A method aspect of the present invention is for making such a cable. The method may comprise forming a cable core, forming an opaque outer jacket surrounding the cable core, and forming identifying indicia visible on an inner surface of the opaque outer jacket when opened, but visually obscured from viewing from outside the opaque outer jacket when unopened. The method may further comprise making a record of the identifying indicia used in the cable separately available for access by a cable user to determine cable authenticity.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
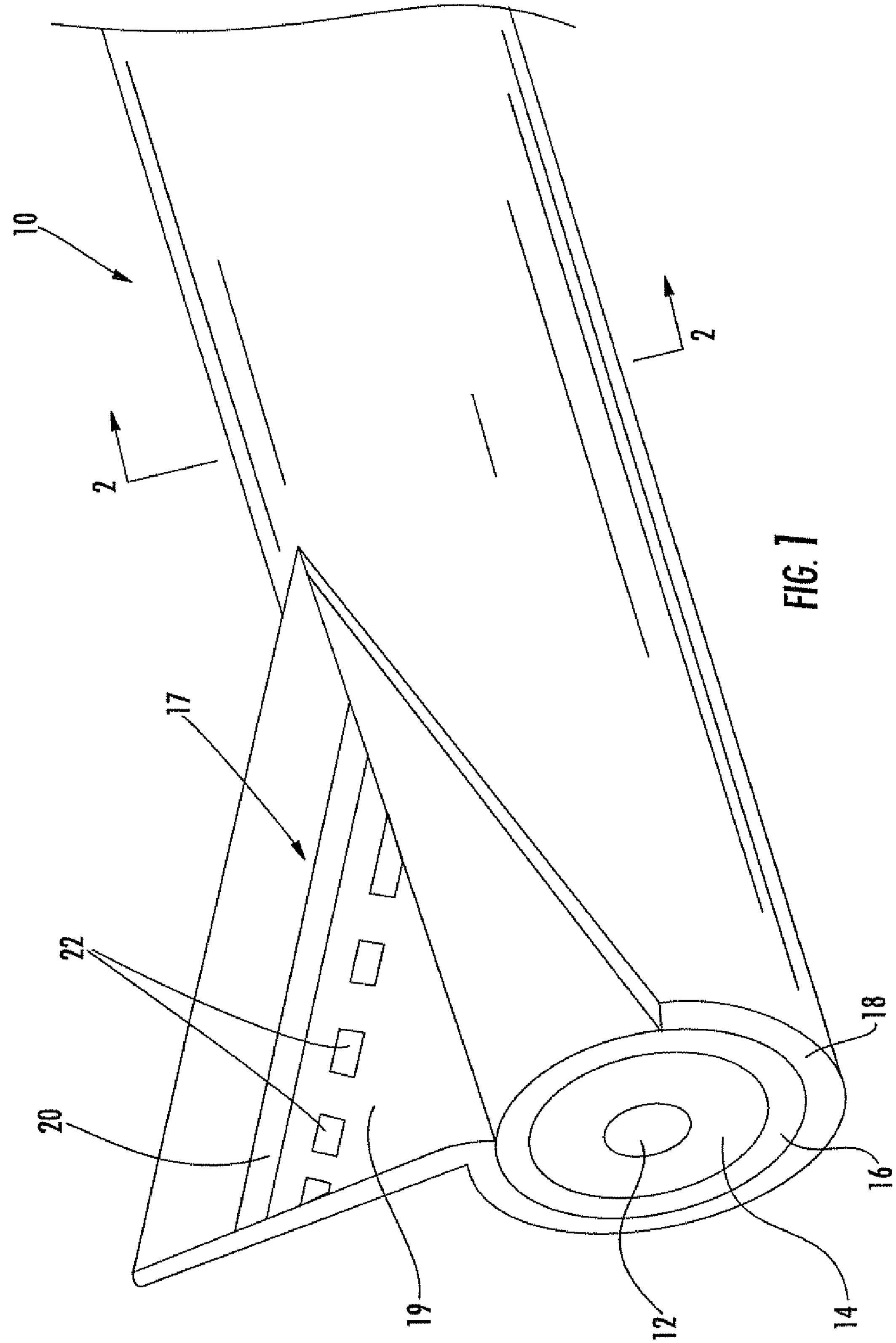
FIG. 1 is a perspective view of an end of a coaxial cable according to the present invention.
Figure 2:
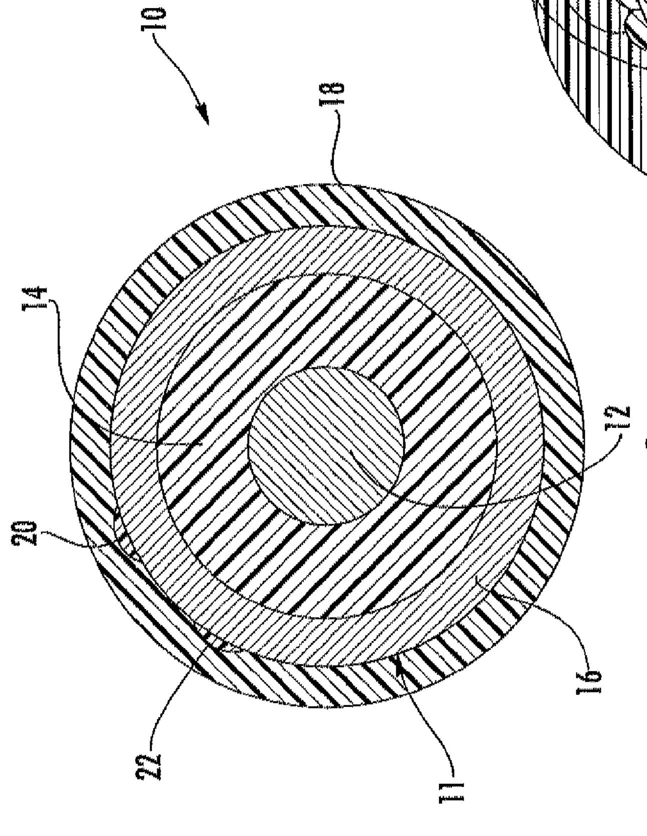
FIG. 2 is a cross-sectional view taken along line 2-2 of FIG. 1.

Referring to FIGS. 1-2, a cable 10 in accordance with the present invention is now described. The cable 10 illustratively takes the form of a coaxial cable 10 where the cable core 11 includes an inner conductor 12, a dielectric layer 14 surrounding the inner conductor, and an outer conductor 16 surrounding the dielectric layer. An opaque outer jacket 18 surrounds the cable core 11 of the coaxial cable 10.

Identifying indicia 17 is visible on an inner surface 19 of the opaque outer jacket 18 when the opaque outer jacket is opened (FIG. 1). However, the identifying indicia 17 are visually obscured from viewing from outside the opaque outer jacket 18 when the opaque outer jacket is unopened as will be appreciated by those skilled in the art. The opaque outer jacket 18 may be opened by cutting or slicing the opaque outer jacket in a longitudinal direction along the cable 10, for example, and peeling back the opaque outer jacket, thus revealing the inner surface 19 and exposing the identifying indicia 17.

The identifying indicia 17 on the inner surface of the opaque outer jacket 18 may include color-coded identifying indicia. Such color-coded identifying indicia 17 may include one or more color(s) and/or color shade(s) of a particular color and associated with an alpha-numeric code. The alpha-numeric code may relate to a manufacturer cable model and lot number, for example. The identifying indicia color code and the associated alpha-numeric code may be made available to the cable user to determine cable authenticity. The color codes and associated alpha-numeric codes may undergo periodic modification so as to further discourage the counterfeiting of cables.

The opaque outer jacket 18 may include a plastic material and the identifying indicia 17 may include a plurality of integrally molded plastic portions with the opaque outer jacket, each having a different color than a color of the opaque outer jacket. The integrally molded plastic portions may be molded onto the inner surface 19 of the opaque outer jacket 18 by extrusion, as discussed below, or any method appreciated by one of skill in the art. The plurality of integrally molded plastic portions may include different colored stripes, such as the continuous strip 20 and the discontinuous stripe 22 as in illustrated cable 10.

The identifying indicia 17 may be other than the illustrated integrally molded plastic stripes 20, 22. For example, the indicia may be a visible ink, or indicia with an emission spectrum in the infrared or ultraviolet regions and visible with optical aids, or any other identifying indicia known to one of skill in the art.

Figure 3:
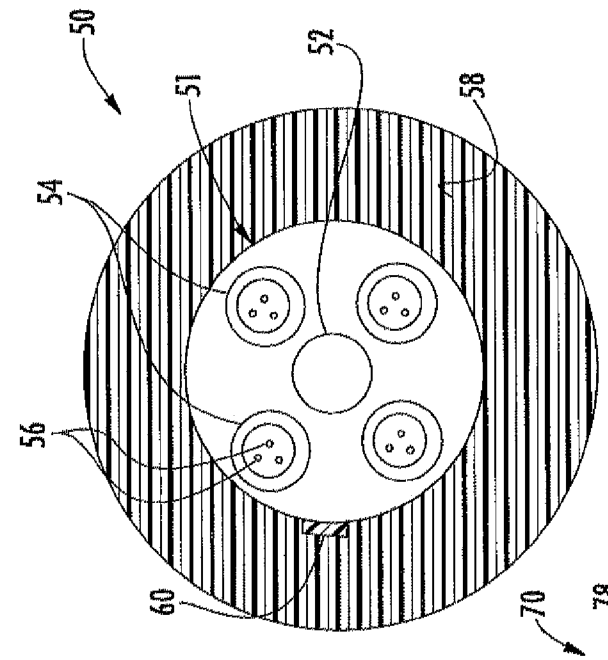
FIG. 3 is a transverse partial cross-sectional view of an optical cable according to the present invention.

The cable may also take the form of an optical cable 50, as illustrated in FIG. 3, comprising a core 51 including a central strength member 52 with adjacent buffer tubes 54 for containing a plurality of fibers 56. The opaque outer jacket 58 surrounds the core 51 of the optical cable 50. The identifying indicia is in the form of an integrally molded single plastic stripe 60 molded into the inner surface of the opaque outer jacket 58.

Figure 4:
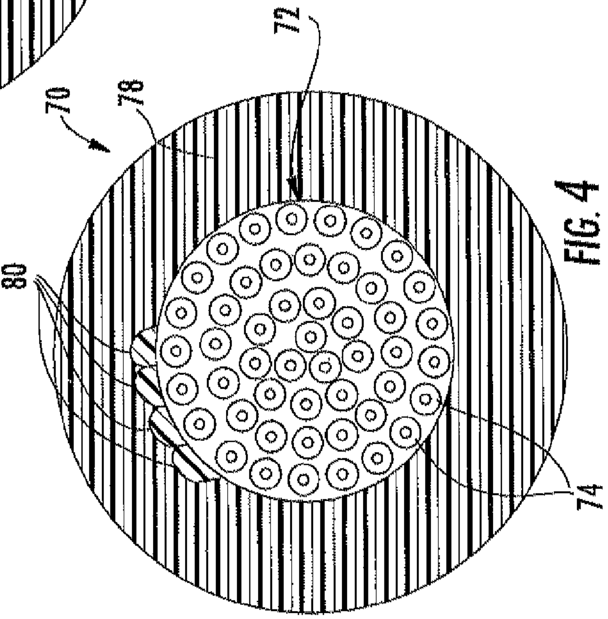
FIG. 4 is a transverse partial cross-sectional view of a twisted pair cable according to the present invention.

The cable may further take the form of an electrical communications cable 70, as illustrated in FIG. 4, comprising a core 72 including a plurality of twisted conductor pairs 74. The opaque outer jacket 78 surrounds the core 72 of the twisted pair cable 70. The electrical communications cable 70 includes a plurality of integrally molded plastic portions in the form of side-by-side stripes 80 molded into the inner surface of the opaque outer jacket 78.

The present invention is not limited to those cable structures discussed above and encompasses all cable structures having a core with one or more electrical or optical components) and an opaque outer jacket surrounding the core.

Figure 5:
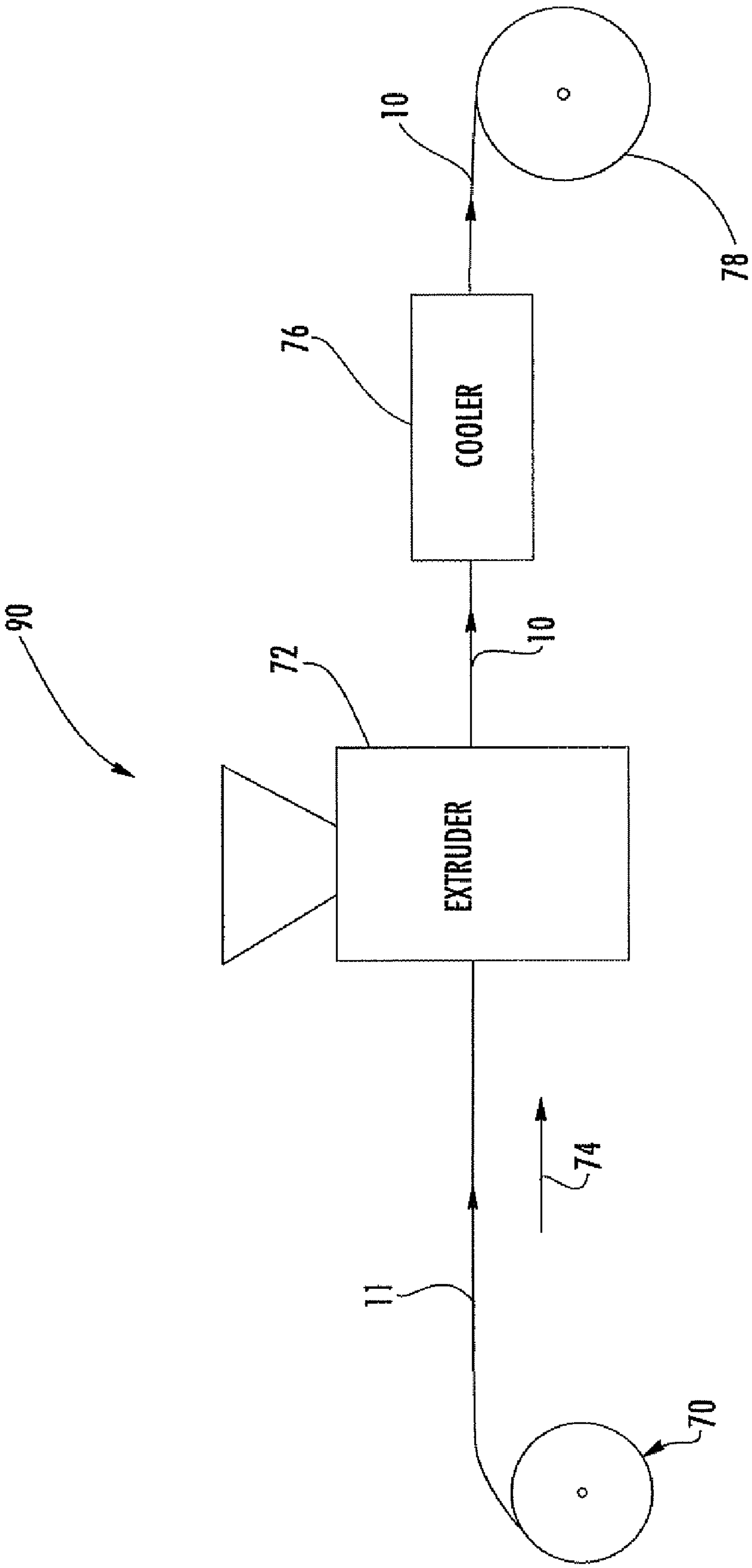
FIG. 5 is a schematic diagram of an apparatus for making the cable according to the present invention.
Figure 6:
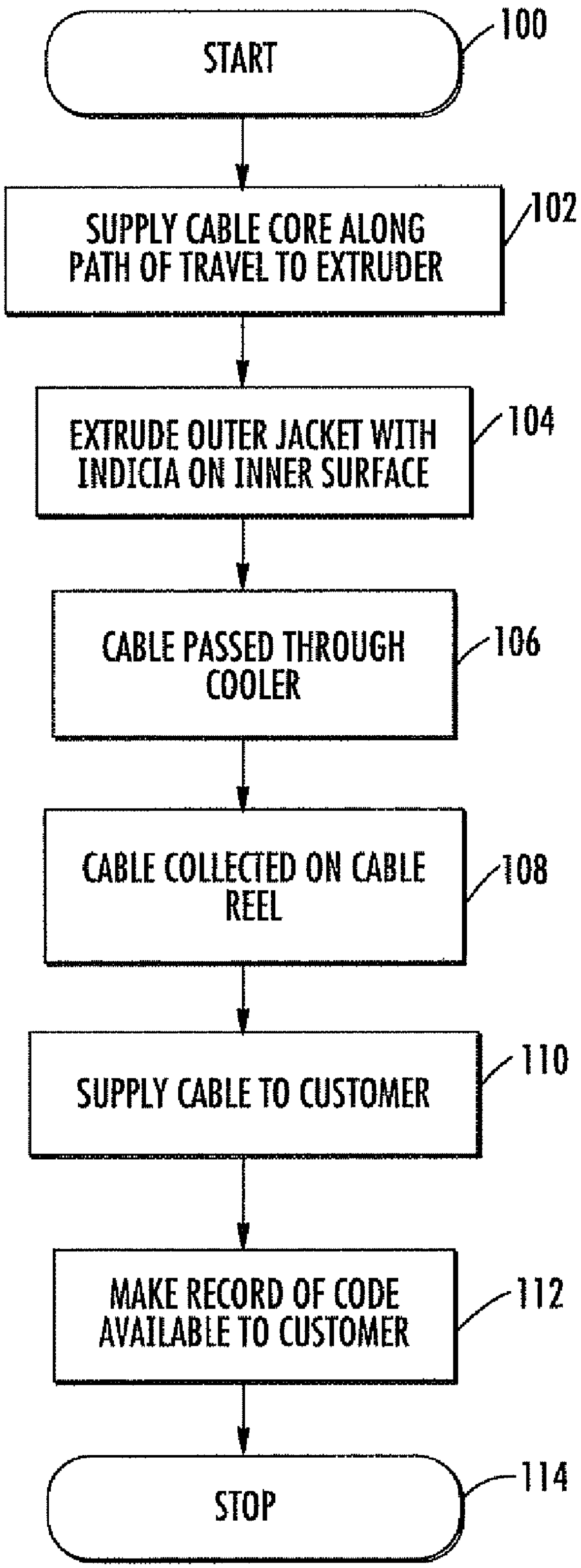
FIG. 6 is a flow chart of a method of making a cable according to the present invention.

Referring now additionally to FIGS. 5-6, a method and apparatus for making a cable is now described. Beginning at Block 100 (FIG. 6), a method for making a cable with an apparatus 90 (FIG. 5) illustratively includes supplying cable core 11 from one or more reel(s) 70 and advancing the core along a path of travel 74 to an extruder 72 (Block 102). The extruder 72 illustratively extrudes an opaque outer jacket to surround the cable core 11 with identifying indicia in the form of one or more plastic stripes visible on an inner surface of the opaque outer jacket when opened, but visually obscured from viewing from outside the opaque outer jacket when unopened (Block 104).

The cable 10, including the cable core, opaque outer jacket and indicia, is passed through a water flow cooler 76 for cooling the outer jacket 18 (Block 106), and wound onto a take-up cable reel 78 (Block 108). The cable 10 is made available to the customer (Block 110), along with a record of the indicia (Block 112) permitting the user to verify cable authenticity, for example.

The record of the indicia may include a viewable copy of the identifying indicia, or a color-code designation of the indicia with accompanying decoding information. The record may be provided to a cable user via a secure database, such as an internet-based database, for example, maintained by the cable manufacturer and accessible by registered cable users. The record may also be in the form of a hardcopy record of the identifying indicia, provided simultaneously to the cable user with the cable 10 or at a time after cable delivery. An updated record 80 may be provided to the cable user upon a periodic modification to the record so to further discourage counterfeiting of the cable 10.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

The invention claimed is:

1. A method for making a cable comprising:

forming a cable core;

forming a plastic opaque outer jacket surrounding the cable core; and forming identifying indicia comprising at least one plastic portion integrally formed with the plastic opaque outer jacket, the plastic portion comprising a plurality of stripes inlaid with the plastic opaque outer jacket, and being visible on an inner surface of the plastic opaque outer jacket when opened, but being visually obscured from viewing from outside the plastic opaque outer jacket when unopened, the forming of the plastic opaque outer jacket and the identifying indicia being based upon a co-extrusion process.

2. The method according to claim 1 wherein the identifying indicia comprises color-coded indicia.

3. The method according to claim 1 wherein the at least one plastic portion integrally formed with the plastic opaque outer jacket has a different color than a color of the plastic opaque outer jacket.

4. The method according to claim 1 wherein forming the plastic opaque outer jacket and at least one plastic portion comprises extruding the plastic opaque outer jacket and the at least one plastic portion surrounding the cable core as the cable core is advanced along a path of travel.

5. The method according to claim 1 wherein the plurality of stripes comprises a plurality of different colored stripes.

6. The method according to claim 5 wherein at least some of the different colored stripes are continuous.

7. The method according to claim 5 wherein at least some of the different colored stripes are in side-by-side relation.

8. The method according to claim 1 wherein the cable core comprises at least one of an optical component and an electrical component.

9. The method according to claim 1 further comprising making a record of the identifying indicia used in the cable separately available for access by a cable user to determine cable authenticity.

10. A method for making a cable comprising:

forming a cable core comprising at least one of an optical component and an electrical component;

forming a plastic opaque outer jacket surrounding the cable core; and forming a plurality of integrally formed plastic color-coded stripes inlaid with the plastic opaque outer jacket and being visible on an inner surface of the plastic opaque outer jacket when opened, but being visually obscured from viewing from outside the plastic opaque outer jacket when unopened, each plastic color-coded stripe being integrally molded with the plastic opaque outer jacket, the forming of the plastic opaque outer jacket and the plurality of integrally formed plastic color-coded stripes being based upon a co-extrusion process.

11. The method according to claim 10 wherein each integrally formed plastic color-coded stripe has a different color than a color of the plastic opaque outer jacket.

12. The method according to claim 10 wherein at least some of the integrally formed plastic colored-coded stripes are continuous.

13. The method according to claim 10 wherein at least some of the integrally formed plastic colored stripes are in side-by-side relation.

14. The method according to claim 10 wherein the cable core comprises at least one of an optical component and an electrical component.

15. The method according to claim 10 further comprising making a record of the plurality of integrally molded plastic color-coded stripes used in the cable separately available for access by a cable user to determine cable authenticity.

* * * * *